Sept. 17, 1929.  K. MARTIN  1,728,426
COLOR CINEMATOGRAPHY
Filed Feb. 17, 1926
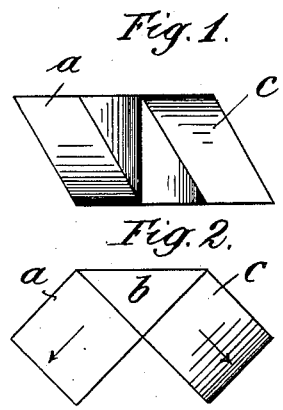
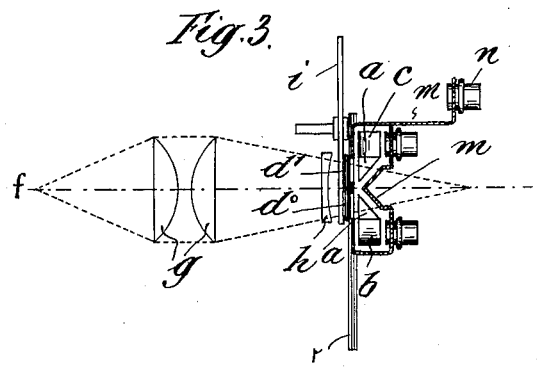
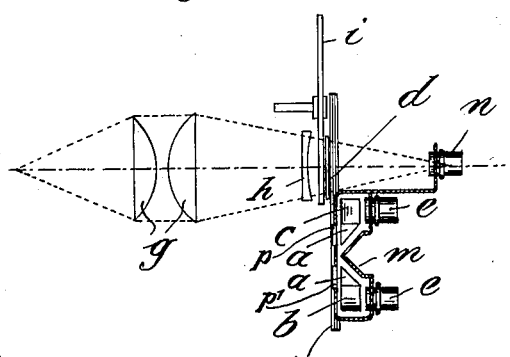
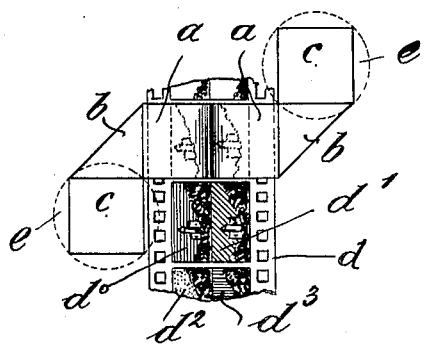
Inventor
Karl Martin
By Knight Bros
attys.

Patented Sept. 17, 1929

1,728,426

UNITED STATES PATENT OFFICE

KARL MARTIN, OF RATHENOW, GERMANY

COLOR CINEMATOGRAPHY

Application filed February 17, 1926, Serial No. 88,812, and in Germany April 11, 1925.

This invention relates to a color cinematographic apparatus.

In my invention I use a film, which may be of the standard size and travels vertically upwards or downwards in the usual manner, each normal frame being divided longitudinally to carry two complementary color records, but the pictures are placed side uppermost, and in projecting the images through appropriate color filters (say red and green) an optical system is used whereby the images are rotated through 90°, to place them upright, and are at the same time moved apart to enable each to be projected through an objective of ample size for giving adequate intensity of light. If instead of only two colors three or four colors are to be used, a frame with two complementary records, for two of the colors, is followed by one with two records made by light of the third color or by light of the third and fourth colors respectively, and all the images are rotated through 90° as described.

It will be noted that with the apparatus which I shall describe each complementary picture is produced, and projected, through an objective whose capacity in regard to intensity of light can be utilized to the full.

In the annexed drawings,

Figs. 1 and 2 are two views of one of the prism systems used in my apparatus,

Figs. 3 and 4 are two plan views of the optical system in two different positions, and Fig. 5 is a front view of the prism systems and the films, the positions of the objectives being indicated in dotted lines.

Figs. 1 and 2 show a prism system, of which one is provided for each complementary picture, that is to say for each objective. It comprises three rectangular prisms $a$, $b$, $c$ and each of two faces of the prism $b$ is cemented to one face of one of the other prisms. The two systems are disposed so that the exposed faces of the prisms $a$ are apportioned, respectively, to the two complementary pictures $d^0$, $d'$ of the film $d$ in a "frame" of standard size, and the exposed faces of the prisms $c$ face the objectives $e$.

It will be apparent that with one of the prism systems held as shown in Fig. 2, an arrow placed as shown behind the prism $c$ would be viewed from the front, through the prism $a$, in the manner indicated in the drawing, the image being rotated through 90°, and this is required for the purposes of the invention, as already explained.

In Fig. 3 a source of light is indicated at $f$, with a condenser $g$ in the path of the beam. I may also use a cylindrical dispensing lens $h$, as shown, or a special condenser system, but these are subsidiary matters not in themselves forming part of the invention.

If only two color partial pictures are to be used, the successive partial pictures $d^0$, $d'$ will be taken and projected through red and green filters for example. On the other hand, if four complementary colors are to be used each pair of complementary partial pictures, for example red and green will be followed by a different pair of complementary partial pictures, for example blue and yellow. This arrangement is symbolically indicated in Fig. 5 in which $d^0$ indicates a partial picture taken through a red filter, $d'$ a partial picture taken through a green filter, $d^2$ through a yellow filter and $d^3$ through a blue filter.

In order to uniformly screen the two complementary pictures during the feed of the film a single shutter $i$ of the usual type may be used, covering both pictures.

It will be understood that an ordinary projecting apparatus, for black and white work, can be adapted for the purposes of my method, by removing the objective, and perhaps also the condenser system or part of it, and substituting the double objective and prism systems which I have described, with such condenser element or elements as may be required. To change back to black and white work is equally simple. The color filters $p$, $p'$ may with advantage be fixed to the objective holder, $m$ on which are mounted the color objectives $e$, $e$, and the objective $n$ for black and white projection, and the changeover can then be made very quickly and easily, particularly if the parts are arranged to slide into and out of position as on the slide $r$. I mention this because it may sometimes be desired to show black-and-white and colored pictures alternately, and films for the former and latter respectively may even be joined together, in one reel.

What I claim is:

Apparatus for cinematographically projecting pictures, comprising a source of light, a vertically travelling film divided into frames, each frame comprising a pair of partial pictures constituting complementary color records, said partial pictures being side uppermost, a pair of prism systems on the side of said film opposite from said source of light for rotating the images of said partial pictures 90° and spreading them apart, objectives and color filters for said prism systems, said prism systems, objectives, and color filters being mounted on a shiftable frame, and an optical system for black-and-white work also mounted on said shiftable frame, the arrangement being such that either the color optical system or the black-and-white optical system can be moved into the path of the projecting light.

In testimony whereof the foregoing specification is signed.

KARL MARTIN.